(12) United States Patent
Kim

(10) Patent No.: US 6,377,000 B2
(45) Date of Patent: Apr. 23, 2002

(54) ELECTRONIC BALLAST FOR GAS DISCHARGE LAMP

(76) Inventor: Joong Seong Kim, 105-707, Hoban Apt., Beea-Dong, Gwangsan-Gu, Gwangju-Si (KR)

( * ) Notice: Subject to any disclaimer, the term of this patent is extended or adjusted under 35 U.S.C. 154(b) by 0 days.

(21) Appl. No.: 09/729,049

(22) Filed: Dec. 4, 2000

(30) Foreign Application Priority Data

Dec. 3, 1999 (KR) .................................. P. 10-1999-54951

(51) Int. Cl.$^7$ ................................................ G05F 1/00
(52) U.S. Cl. .................. 315/307; 315/209 R; 315/224; 315/248; 315/277; 315/283; 315/DIG. 7
(58) Field of Search ............................ 315/307, 209 R, 315/219, 224, 225, 246, 248, 277, 283, 291, DIG. 2, DIG. 7

(56) References Cited

U.S. PATENT DOCUMENTS 5,907,223 A * 5/1999 Gu et al. ..................... 315/307
6,107,754 A    8/2000 Kim ........................... 315/291

* cited by examiner

*Primary Examiner*—Don Wong
*Assistant Examiner*—Thuy Vinh Tran

(74) *Attorney, Agent, or Firm*—Ostrolenk, Faber, Gerb & Soffen, LLP

(57) ABSTRACT

An electronic ballast for a gas discharge lamp has a power source section for receiving a commercial AC to provide a DC voltage, and an inverter section, in response to a pair of switching driving signals, for switching and transforming an output voltage of the power source section at a high speed as an AC power source that is supplied to the gas discharge lamp. For controlling the switching of the inverter section, an inverter controlling section generates a pair of switching driving signals respectively having a predetermined dead time in a switching-ON time interval with a phase difference of 180 degrees from each other to supply them to the inverter section. The inverter controlling section embodies an analog-based system in controlling the gradual shifting of the frequencies of the switching driving signals, which drive the inverter section from an optional frequency f1 to another frequency f2 in accordance with the time and the periodical repetition of the frequency shift, to stably light the gas discharge lamp by preventing the flame fluctuation or acoustic resonance. The inverter controlling section further has circuits for maintaining the constant output, controlling the starting and for performing various protecting operations. An auxiliary power source section uses the output voltage of the power source section to provide an auxiliary power source required for the inverter controlling section.

6 Claims, 4 Drawing Sheets

ELECTRONIC BALLAST FOR GAS DISCHARGE LAMP

BACKGROUND OF THE INVENTION

1. Field of the Invention

The present invention relates to an electronic ballast for maintaining the lighting of a gas discharge lamp, and more particularly to an electronic ballast for maintaining the on-status of a high-voltage gas discharge lamp by using an analogically-configured circuit.

2. Description of the Prior Art

Generally, when maintaining the lighting of a gas discharge lamp, especially metal halide lamp, by means of an electronic ballast, flame fluctuates unstably or acoustic resonance is produced. A method for stably maintaining the lighting of the gas discharge lamp while preventing the unstable flame fluctuation or acoustic resonance is disclosed by U.S. Pat. No. 6,107,754. In this method, the light-ON state of the gas discharge lamp is maintained in a manner that the frequencies of driving signals required for lighting the gas discharge lamp is varied within a preset bandwidth in a stepped level to be periodically repeated for the purpose of preventing the flame fluctuation or acoustic resonance during the light-ON state. That is, the method employs a digital controlling means such as a microprocessor to provide the driving frequencies and waveforms to an inverter circuit.

Meanwhile, if the metal halide lamp is driven by a high frequency, the frequency is commonly over 100 Khz. For forming such a waveform by means of the microprocessor, the microprocessor employed should have a speed of 2 Mips or higher when processing an instruction. In addition to incurring high cost, such a high performance microprocessor has a drawback of being vulnerable to external noises because of the increased processing speed. Furthermore, in case of a high voltage gas discharge lamp, a voltage as high as several to several tens of kilovolts is required for initiating the lighting of the lamp. At this time, the signal liably introduced as a noise to the microprocessor which is operated by a voltage of 5volts induces a malfunction of the microprocessor or occasionally turns off the lighted gas discharge lamp, while in severe cases, it fatally damages the ballast.

SUMMARY OF THE INVENTION

In view of the above, a first object of the present invention is to provide an electronic ballast capable of stably maintaining the light-on operation of a gas discharge lamp in such that, instead of employing a microprocessor which is a digital control means, periodical repeating of shifting driving signals required for an inverter circuit for supplying an electric power source to the gas discharge lamp from f1 to f2 is embodied by an analog system.

A second object of the present invention is to provide an electronic ballast for a gas discharge lamp capable of stably maintaining the output of the gas discharge lamp by means of a frequency control.

A third object of the present invention is to provide an electronic ballast for a gas discharge lamp capable of performing a safe starting by appropriately adjusting the initial starting output.

A fourth object of the present invention is to provide an electronic ballast for a gas discharge lamp having a relatively large output practical by optionally controlling a dead time when driving an inverter.

The last object of the present invention is to provide an electronic ballast for a gas discharge lamp capable of being protected against over-current, over-heat, no load and inferiority of the gas discharge lamp.

To achieve the above objects, the present invention provides an electronic ballast for a gas discharge lamp which comprises a power source section for receiving and transforming an AC power source to a DC voltage, and an inverter section which, in response to switching driving signals, switches an output voltage of the power source section at a high speed as an AC power source and provides the AC power source to a gas discharge lamp.

In the electronic ballast, an inverter control section generates a pair of switching driving signals respectively having a predetermined dead time within a switching-ON time interval and a phase difference of 180 degrees from each other, while an auxiliary power source section, by means of the output voltage of the power source section, supplies an auxiliary power source required in the inverter controlling section, and a starting section generates a high voltage when performing a starting operation.

Here, the inverter controlling section has an inverter driving unit controlled by a predetermined frequency shift signal for supplying the switching driving signals to the inverter section by being sequentially shifted from a reference frequency to another predetermined frequency for one period, and further has a frequency shift unit for supplying the predetermined frequency shift signal to the inverter driving unit. At this time, the inverter driving unit includes a PWM IC, and an output dividing circuit for dividing two output signals of the PWM IC to provide them as the switching driving signals. The frequency shift unit has an analog circuit for gradually changing a resistance value applied to an RT terminal for determining the output signal frequency of the PWM IC in accordance with a time for one period and then periodically repeat the change of the resistance value. According to the aforementioned configuration, the inverter control circuit gradually shifts the frequency of the switching driving signals that drive the inverter circuit from an optional frequency f1 to another frequency f2 in accordance with the time, and the control of periodically repeating the above-stated frequency shift is embodied by the analog system. Thus, the flame fluctuation or acoustic resonance which occurs during the maintaining of the light-on operation of the gas discharge lamp is prevented to provide the stable lighting operation.

Preferably, the inverter controlling section further has a constant output control unit for stabilizing an output of the gas discharge lamp in a rated output level by the feedback of the power source applied to the gas discharge lamp.

More preferably, the inverter controlling section includes a starting control unit for controlling the frequency of the switching driving signals to be lower than a constant output frequency during the starting of the gas discharge lamp to heighten the output of the gas discharge lamp, thereby allowing the gas discharge lamp to be easily started.

Furthermore, it is preferable that the inverter controlling section includes a protection circuit unit for protecting the ballast by blocking the switching driving signals in case of overheat of the ballast, starting failure and over-current.

BRIEF DESCRIPTION OF THE DRAWINGS

The above objects and other advantages of the present invention will become more apparent by describing in detail preferred embodiments thereof with reference to the attached drawings, in which.

DETAILED DESCRIPTION OF THE PREFERRED EMBODIMENTS

Figure 1:
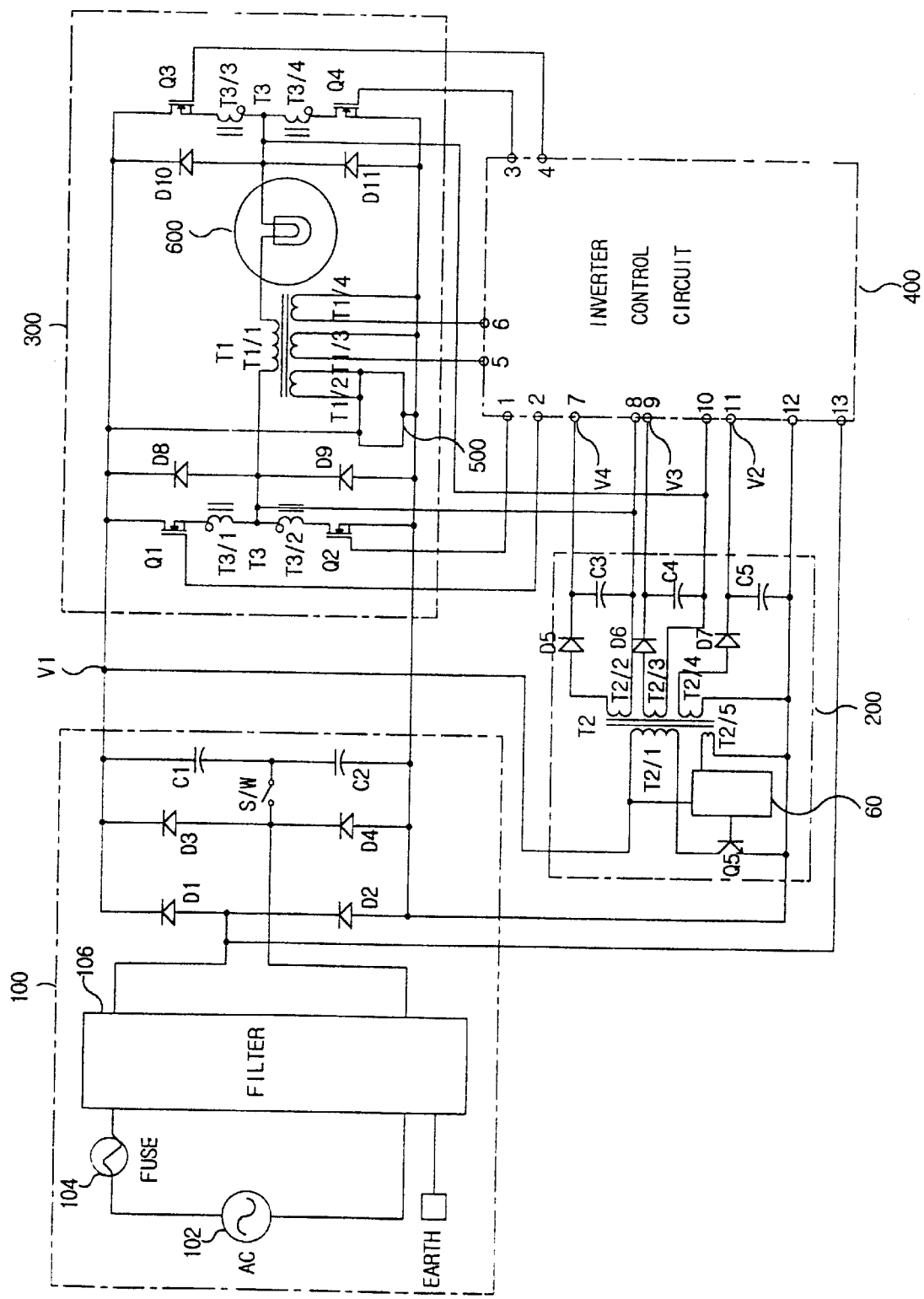
FIG. 1 is a block diagram of an electronic ballast for a gas discharge lamp according to the present invention.

FIG. 1 schematically shows a circuit configuration of an electronic ballast for a gas discharge lamp according to a preferred embodiment of the present invention. The ballast according to the present invention largely includes a power source circuit 100, an auxiliary power source circuit 200, an inverter circuit 300, an inverter control circuit 400 and a starting circuit 500.

Power source circuit 100 has a fuse 104, a filter 106, diodes D1, D2, D3 and D4 for full-wave rectification, capacitors C1 and C2, and a switch S/W. An AC power source 102 in ordinary use passes through filter 106 for controlling an EMI to be transformed into a DC voltage via full-wave rectifying diodes D1, D2, D3 and D4. Capacitors C1 and C2 flatten the converted DC to be supplied as a first DC voltage V1. At this time, the output voltage obtained from capacitors C1 and C2 differs in accordance with the status of switch S/W, which is a single voltage in case of the OFF state of switch S/W or a divided voltage in case of the ON state thereof.

Auxiliary power source circuit 200 has a transformer T2, diodes D5, D6 and D7, capacitors C3, C4 and C5, a switching device Q5 and an auxiliary power source switch 60. Transformer T2 includes five coils T2/1, T2/2, T2/3, T2/4 and T2/5. Auxiliary power source circuit 200 provides a variety of auxiliary power sources V2, V3 and V4 required for inverter control circuit 400. Auxiliary power sources V2, V3 and V4 are obtained by performing the half-wave rectification and flattening upon the voltage excited at second coil T2/2, third coil T2/3 and fourth coil T2/4 of transformer T2 during conducting the high speed switching of switching device Q5. Auxiliary power source switch 60 switches switching device Q5 at high speed by the inherent oscillation.

Inverter circuit 300 is configured by a full-bridged type inverter circuit having switching devices Q1, Q2, Q3 and Q4, diodes D8, D9, D10 and D11 and a transformer combined with a current-stabilizing inductor T1. Preferably, inverter circuit 300 further includes a transformer T3 for rejecting switching noises. Inductor-combined transformer T1 has four coils T1/1, T1/2, T1/3 and T1/4, and transformer T3 also has four coils T3/1, T3/2, T3/3 and T3/4. In inverter circuit 300, a pair of switching devices Q1 and Q4 and other pair of switching devices Q2 and Q3 are simultaneously switched alternately in response to the driving signals generated from inverter control circuit 400, i.e., those shown in FIGS. 3B and 3C, so that the voltage waveform of repeating the shifting from an optional frequency f1 of FIG. 3A to another optional frequency f2 in accordance with time is formed by the analog-based system to light a gas discharge lamp 600.

Once inverter circuit 300 has initiated its switching operation, switching noises may occur during the switching operation. Transformer T3 is introduced into inverter circuit 300 for suppressing the switching noises. The switching noises is removed by compensation effects of reverse-winded coils T3/1 and T3/4 when switching devices Q1 and Q4 are switched to ON state, and by another reverse-winded coils T3/2 and T3/3 when switching devices Q2 and Q3 are switched to ON state. Switching devices Q1 to Q4 are switched at a very high frequency, and transformer T3 can prevent switching devices Q1 to Q4 from being damaged by a transient current upon starting by introducing an electric power.

Starting circuit 500 receives output voltage V1 of power source circuit 100 to provide a high voltage required for staring gas discharge lamp 600, i.e., a voltage of several thousands to billions volts, thereby supplying it to gas discharge lamp 600 via transformer T1. Once gas discharge lamp 600 is successfully lighted on by the starting voltage supplied from starting section 500, starting section 500 terminates its operation.

Figure 2:
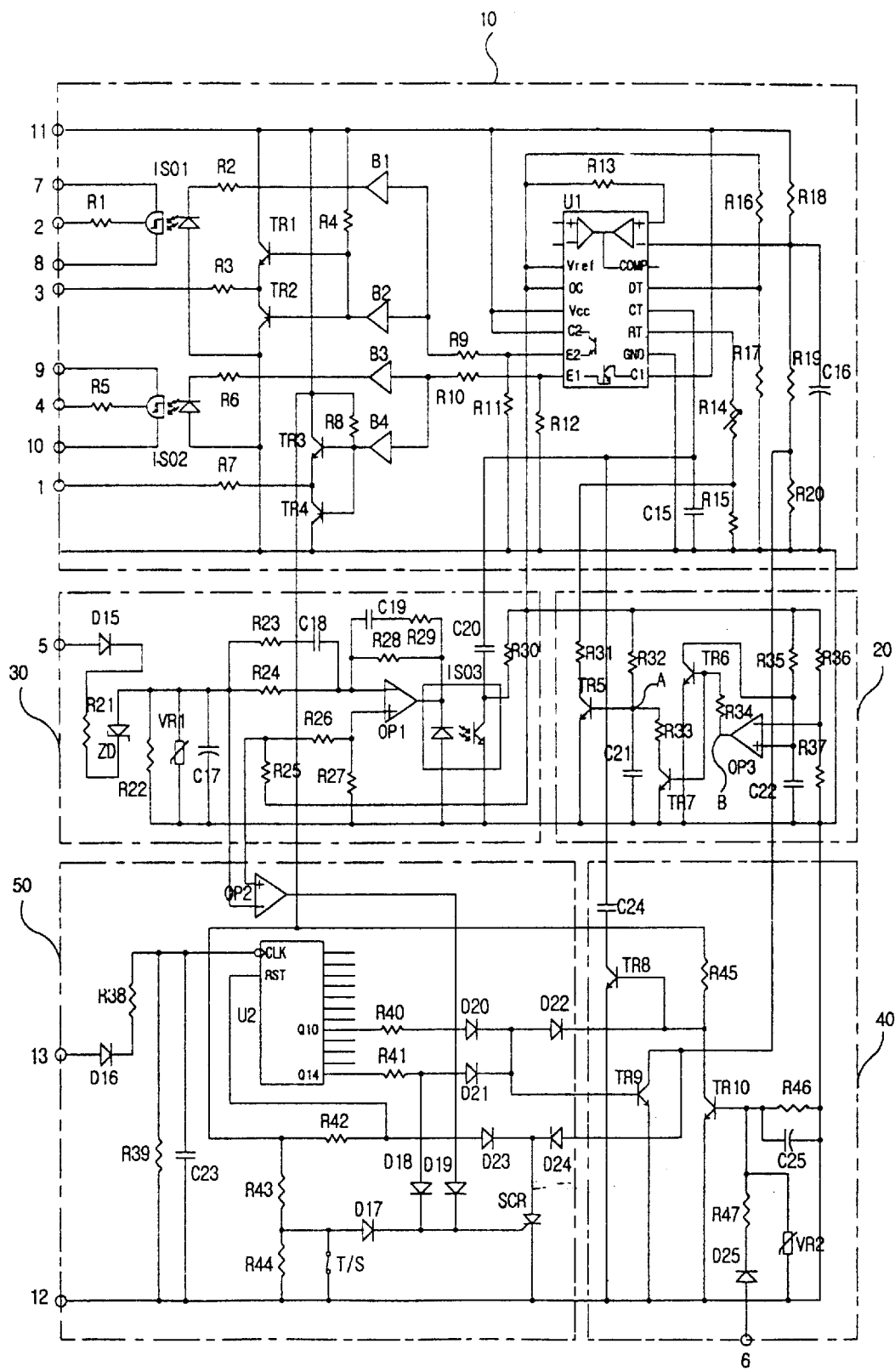
FIG. 2 shows an inverter controlling circuit according to a preferred embodiment of the present invention.

Referring to FIG. 2, inverter control circuit 400 includes an inverter driving section 10, a frequency shift section 20, a constant output control section 30, starting control section 40 and a protection circuit section 50.

Inverter driving section 10 has a PWM IC U1 for generating driving signals required for alternately switching switching devices Q1 and Q4 and switching devices Q2 and Q3 of inverter circuit 300 as described above, buffers B1, B2, B3 and B4, NPN-type switching transistors TR1 and TR3 and PNP-type transistors TR2 and TR4, opto-isolators ISO1 and ISO2, resistors R1 to R20 and capacitors C15 and C16.

In describing inverter driving section 10 in more detail, the power source of inverter driving section 10 is plus 12 volts of second DC voltage V2 from a connection point 11 and a minus voltage from a connection point 12. Connection point 11 is connected between a terminal Vcc and terminals C1 and C2 of PWM IC U1. A reference frequency is determined by resistors R14 and R15 connected between a terminal RT and minus terminal 12 of PWM IC U1 and by capacitor C15 connected between a terminal CT and minus terminal 12. In PWM IC U1, a signal existing section of the output signal, i.e., a dead time in a switching-ON time interval, is determined by a resistance value applied to a terminal DT. Namely, by properly adjusting a resistance ratio of two resistors R16 and R17 connected between a reference voltage terminal Vref of PWM IC U1 and minus terminal 12, the dead time between the switching-ON time interval of the output signals can be determined as desired. A connection point of two resistors R16 and R17 is connected to terminal DT of PWM IC U1. A PWM-controlling non-inverting terminal (+) of PWM IC U1 is connected to reference voltage terminal Vref via resistor R13, and resistors R18, R19 and R20 are serially connected between external connection terminal 11 and a minus terminal 12. Also, a connection point of resistors R18 and R19 is connected to an inverting terminal (−) of PWM IC U1, and capacitor C16 is connected between this connection point and minus terminal 12. Reference voltage terminal Vref is connected to a terminal OC. The output signal of PWM IC U1 is alternately generated from terminals E1 and E2, and resistors R11 and R12 are respectively connected between respective output terminals E1 and E2 and minus terminal 12.

A buffer is employed for supplying a single output signal to two sides, in which inputs of buffers B1 and B2 are connected with each other and resistor R9 is interposed between the connection point of buffers B1 and B2 and output terminal E2 of PWM IC U1. Then, an output of buffer B1 is connected to an input terminal of opto-isolator ISO1 via resistor R2. Collectors of transistors TR1 and TR2 are respectively connected between DC terminal 11 and minus terminal 12, and a connection point of emitters of transistors TR1 and TR2 is connected to inverter circuit 300 via resistor R3 and an external connection point 3. Resistor R4 is connected to the bases of transistor TR1 and TR2 and plus voltage 11, and this connection point is connected to the output of buffer B2.

In the same way, resistor R10 is connected between respective inputs of buffers B3 and B4 and output terminal E1 of PWM IC U1. The output of buffer B3 is connected to an input terminal of opto-isolator ISO2 via a resistor R6. Collectors of transistors TR3 and TR4 are respectively connected between terminal 11 of second DC voltage V2 and minus terminal 12, and an emitter connection point of transistors TR3 and TR4 is connected to inverter circuit 300 via resistor R7 and then connection point 1. Resistor R8 is connected to the bases of transistors TR3 and TR4 and second DC voltage V2, and this connection point is connected to the output of buffer B4.

A fourth DC voltage V4 of auxiliary power source circuit 200 is supplied as a power source for driving a gate of switching device Q1 of inverter circuit 300, and a signal received via buffer B1 is connected to the gate of switching devices Q1 by connecting a signal insulated by opto-isolator ISO1 to terminal 2 via resistor R1. A third DC voltage V3 of auxiliary power source circuit 200 is supplied as a power source for driving a gate of switching device Q3 of inverter circuit 300. The signal received via buffer B3 is connected to the gate of switching device Q3 by connecting the signal insulated by opto-isolator ISO2 to terminal 4 via resistor R5.

Figure 3:
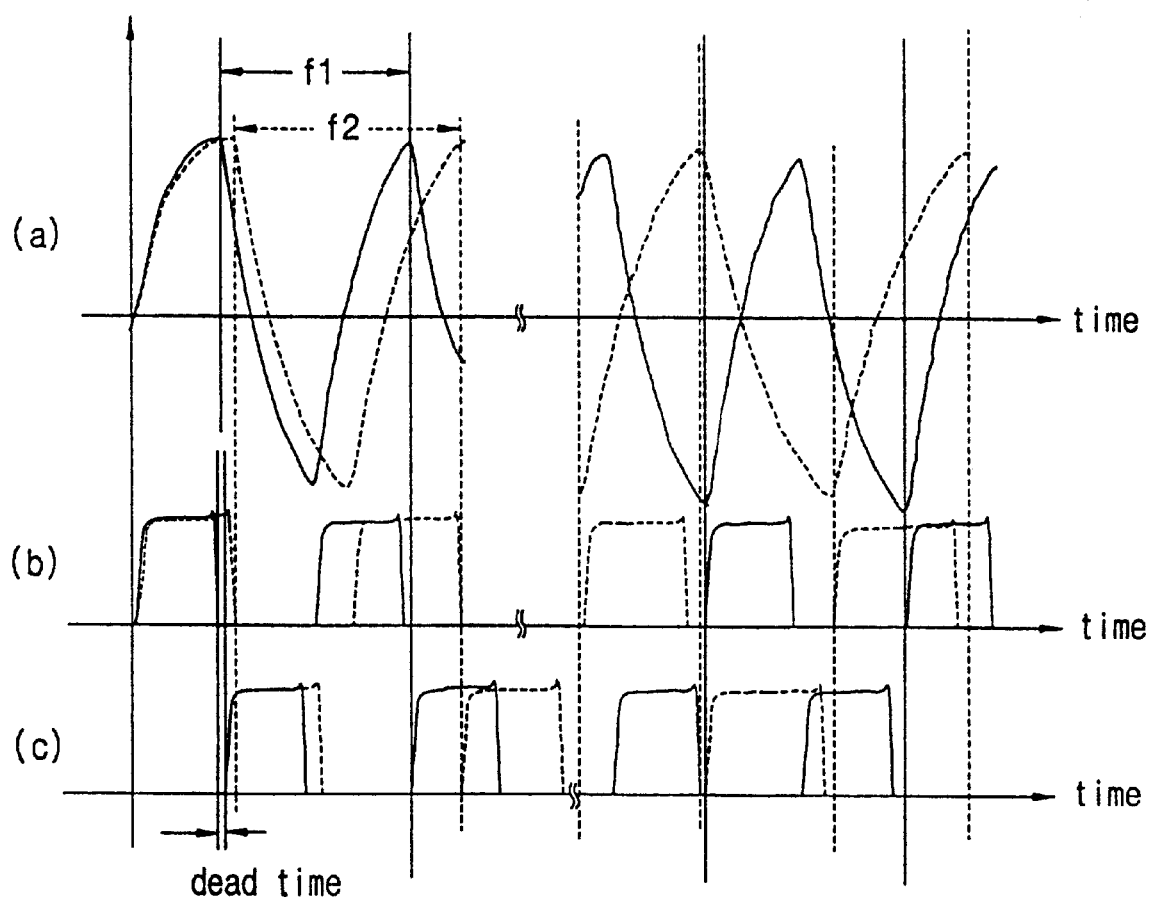
FIG. 3A shows voltage waveforms supplied from an inverter circuit according to the preferred embodiment of the present invention to a gas discharge lamp.
FIG. 3B shows waveforms of gate driving signals of Q1 and Q4 switching transistors supplied from an inverter controlling circuit.
FIG. 3C shows waveforms of gate driving signals of Q2 and Q3 switching transistors supplied from the inverter controlling circuit.

By this construction, inverter driving section 10 generates the two driving signals as shown in FIGS. 3B and 3C via output terminals E1 and E2 to be supplied to inverter circuit 300. Here, two driving signals have the dead time during the switching-ON time (signal existing section), and two pairs of switching devices Q1&Q4 and Q2&Q3 are alternately switched while maintaining a phase difference of 180 degrees from each other, and the switching device in the respective pairs has a simultaneously-switched waveform.

Frequency shift section 20 permits the frequency of the voltage supplied to gas discharge lamp 600 to vary from a predetermined first frequency f1 to a predetermined second frequency f2 per time by each period. Included as parts thereof are resistors R31 to R37, capacitors C21 and C22, transistors TR5, TR6 and TR7 and an OP amplifier OP3. Resistor R31 is connected between a connection point of resistors R14 and R15 of inverter driving section 10 and a collector of transistor TR5, and an emitter thereof is connected to minus terminal 12. Resistor R32 and capacitor C21 are serially connected between reference voltage Vref of PWM IC U1 and minus terminal 12, and a base of transistor TR5 is connected to this connection point. Resistor R33 is interposed between the base of transistor TR5 and a collector of transistor TR7, and an emitter of transistor TR7 is connected to minus terminal 12. Also, the base of transistor TR7 is connected to the connection point of the base of transistor TR6 and resistor R34. Resistors R36 and R37 are serially connected between reference voltage Vref of PWM IC U1 and minus terminal 12, and a serial connection point is connected to an inverting terminal (−) of OP amplifier OP3. Resistor R35 and capacitor C22 are serially connected between reference voltage Vref of PWM IC U1 and minus terminal 12, and a serial connection point is connected to a non-inverting terminal (+) of OP amplifier OP3. The serial connection point of resistor R35 and capacitor C22 is connected to a collector of transistor TR6. An emitter of transistor TR6 is connected to minus terminal 12, and a base thereof is connected to an output of OP amplifier OP3 via resistor R34. The frequency of the driving signal generated by PWM IC U1 is determined by the resistance value applied to a terminal RT associated with internal frequency determining factors. Therefore, the frequency shift required for the flame stabilization is carried out by periodically changing the resistance value applied to terminal RT of PWM IC U1 in accordance with the time. More specifically, the voltage divided by resistors R36 and R37 is supplied to inverting terminal (−) of OP amplifier OP3, and capacitor C22 is charged up via resistor R35 to apply the charge upon non-inverting terminal (+) thereof. At this time, the output signal of OP amplifier OP3 maintains the low state until the voltage of non-inverting terminal (+) of OP amplifier OP3 does not exceed the voltage of inverting terminal (−). Once the voltage of non-inverting terminal (+) of OP amplifier OP3 finally exceeds the voltage of inverting terminal (−), OP amplifier OP3 provides a pulse signal of a predetermined level. Then, this pulse signal turns on transistor TR6. Together with this operation, the charge filling up capacitor C22 is discharged to allow the voltage of capacitor C22 to be low. The charging and discharging of capacitor C2 as described above are repeated by a predetermined period. By this charging and discharging operation, transistor TR7 is ON and OFF by the same period, which in turn periodically charges and discharges the potential filling up capacitor C21 via resistor R32. The waveforms related to the foregoing operation are shown in FIGS. 4A and 4B.

Figure 4:
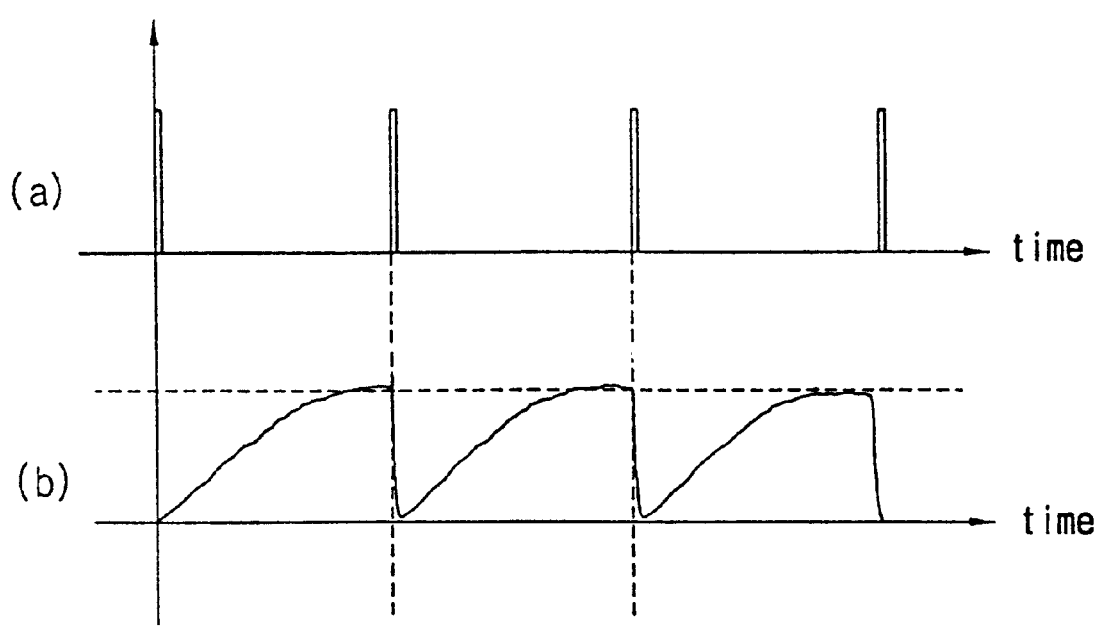
FIGS. 4A and 4B are waveforms respectively provided at points B and A of a frequency shift section according to the present invention.

When the pulse signal is periodically generated from the output terminal of point B OP amplifier OP3 as shown in FIG. 4A, a voltage waveform of a preceding terminal of point A of capacitor C21 is periodically changed while being shaped as an approximately triangular waveform as shown in FIG. 4B. By doing so, the current flowing through transistor TR5 is changed in accordance with the time. Due to the periodical change of the current of transistor TR5 with a predetermined swing width, the resistance value applied to frequency-determining terminal RT of PWM IC U1 is varied in accordance with the time for each period from a serial resistance value, i.e., R14+R15, to serial+parallel resistance value, i.e., R14+(R15//R31). As a result, the waveforms of the driving signals formed by inverter driving section 10 represent periodically repeating of the signals shifted in accordance with the time as shown in FIGS. 3B and 3C. In view of the waveforms as shown in FIGS. 3B and 3C, the solid line indicates the waveform of the driving signal presented at the onset of every period, and the dotted-line indicates that presented at the end of every period. In response to the periodical frequency shift of the driving signal as described above, the frequency of the voltage supplied to gas discharge lamp 600 is changed from the solid-lined waveform (where the frequency is f1) at the initial time of each period as shown in FIG. 3A to the dotted waveform (where the frequency is f2) at the final stage of the corresponding period.

Constant output control section 30 consists of a diode D15, a zener diode ZD, an OP amplifier OP1, an opto-isolator ISO3, a varistor VR1, resistors R21 to R30, and capacitors C17 to C20. Diode D15 and resistor R21 are serially connected between a terminal 5 and a cathode of zener diode ZD, and resistor R22, varistor VR1 and capacitor C17 are parallel connected between an anode of zener diode ZD and minus terminal 12. Serially-connected R23 and capacitor C1 8 are connected in parallel with resistor R24 to be interposed between the anode of zener diode ZD and inverting terminal (−) of OP amplifier OP1. Resistors R25, R26 and R27 are serially connected between reference voltage Vref of PM IC U1 and minus terminal 12 of inverter driving section 10, and a connection point of resistor R26 and resistor R27 is connected to a non-inverting terminal (+) of OP amplifier OP1. The serially-connected capacitor C19 and resistor R29 are connected in parallel with resistor R28 to be interposed between the inverting terminal and output terminal of OP amplifier OP1. The output of OP amplifier OP1 is connected to an input terminal of opto-isolator ISO3. Capacitor C20 is connected between a terminal CT of PWM IC U1 and an output terminal of opto-isolator ISO3, and resistor R30 is inserted between the reference voltage of PWM IC U1 and the output terminal of opto-isolator ISO3.

By the above-described construction of constant output control section 30, the output of gas discharge lamp 600 is controlled to be stably maintained even if the output number of watts of gas discharge lamp 600 fluctuates. Now, this operation will be described in more detail. Upon the lighting of gas discharge lamp 600, the voltage is excited at the third coil T2/3 of the second side of inductor-combined transformer T1 of inverter circuit 300. The level of this induction voltage varies in view of the output number of watts. The induction voltage varied at third coil T2/3 is rectified by diode D15, and becomes a rated voltage by resistors R21 and R22 and zener diode ZD. Thereafter, the resultant voltage is flattened by capacitor C17 and its noise level is lowered down by a RC circuit R23, R24 and C18, which is in turn supplied to inverting terminal (−) of OP amplifier OP1. OP amplifier OP1 appropriately amplifies the voltage supplied into inverting terminal (−) thereof by using the voltage applied to the non-inverting terminal (+) as a reference. This signal is supplied to opto-isolator ISO3 for eliminating the noise, and the current flowing through opto-isolator ISO3 is varied in accordance with the magnitude of the signal applied. In accordance with the magnitude of this signal, the value of the capacitor connected to terminal CT which is one frequency-determining element of PWM IC U1 is controlled to perform the constant output controlling operation. In other words, if the output number of watts is lowered, the output voltage of OP amplifier OP1 becomes high. By doing so, capacitor C20 connected to opto-isolator ISO3 effectively attains the parallel connection with capacitor C15 for determining the reference frequency, so that the capacitance value applied to terminal CT of PWM IC U1 is increased with the result of finally lowering the frequency of the driving signal of PWM IC U1. As a result, the output number of watts of gas discharge lamp 600 becomes high. On the contrary, if the output number of watts of gas discharge lamp 600 goes high, the capacitance value applied to terminal CT of PWM IC U1 is decreased to raise the frequency of the driving signal of PWM IC U1. Consequently, the output number of watts of discharge lamp 600 is forced to be lowered. In this way, constant output control section 30 suitably controls the number of driving signal frequency of PWM IC U1 based on the number of output wafts of gas discharge lamp 600 fedback via third coil T1/3 of transformer T1.

Starting control section 40 is formed by a diode D25, transistors TR8, TR9 and TR10, a varistor VR2, resistors R45, R46 and R47 and capacitors C24 and C25. Capacitor C24 is inserted between terminal CT of PWM IC U1 and a collector of transistor TR8. An emitter of transistor TR8 is connected to minus terminal 12, and a base of transistor TR8 is connected to a connection point of resistor R45 and a collector of transistor TR10. Resistor R45 is connected between supply voltage terminal 11 of second DC voltage V2 and the collector of transistor TR10, and an emitter of transistor TR10 is connected to minus terminal 12. Resistor R46, capacitor C25 and varistor VR2 are parallel connected between a base of transistor TR10 and minus terminal 12. A connection point 6 is connected to the base of transistor TR10 via diode D25 and resistor R47. A collector of transistor TR9 is connected to a connection point of resistors R19 and R20 of inverter driving section 10. An emitter thereof is connected to minus terminal 12, and a base is connected to a cathode of diode D21 of counter U2 in protection circuit section 50.

Starting control section 40 applies the frequency that is lower than the constant output frequency during the starting operation to obtain a smooth start up. In other words, no voltage is excited at the secondary side of transformer T1 of inverter circuit 300 prior to lighting gas discharge lamp 600. Because no voltage is excited at terminal 6 under this state, transistor TR10 is in the OFF state. Accordingly, transistor TR8 becomes ON via resistor R45. Therefore, capacitor C24 attains the parallel joint with capacitor C15 for determining the reference frequency of terminal CT of PWM IC U1, thereby increasing the capacitance value applied to terminal CT. For this reason, the frequency of the driving signal of PWM IC U1 is lowered to heighten the output number of watts of gas discharge lamp 600, thereby smooth start can be obtained. Once the starting is successfully conducted, the voltage is excited at fourth coil T1/4 of inductor-combined transformer T1 of inverter circuit 300. The induction voltage is subjected to the half-wave rectification by diode D25 via connection point 6, the flattening by means of capacitor C25 and adequate adjusting of the current by resistors R46 and R47, thereby turning on transistor TR10. By doing so, transistor TR8 is OFF to open capacitor C24. Accordingly, because terminal CT of PWM IC U1 is applied with only capacitor C15 for determining the reference frequency, the driving signal of PWM IC U1 has the normal frequency, thereby maintaining the normal light-ON state. Also, if transistor TR9 is off, PWM IC U1 normally provides the driving signal. Whereas, if transistor TR9 is on, PWM IC U1 stops the output of the driving signal to protect the ballast.

Protection circuit section 50 is formed by counter IC U2, an OP amplifier OP2, diodes D16 to D24, a temperature switch T/S, a thyristor SCR, resistors R38 to R44, and a capacitor C23. Diode D16 and resistor R38 are serially connected between a clock terminal CLK of counter U2 and an external connection point 13, and resistor R39 and capacitor C23 are connected in parallel with each other between clock terminal CLK and minus terminal 12. Resistors R43 and R44 are serially connected between input terminal 11 of second DC voltage V2 and minus terminal 12, and temperature switch T/S is connected in parallel with resistor R44. A connection point of resistors R43 and R44 is connected to a gate of thyristor SCR via diode D17. A reset terminal RST of counter IC U2 is connected to terminal 11 of second DC voltage V2 via resistor R42, which is also connected to an anode of thyristor SCR via diode D23. A cathode of diode D24 is connected to the anode of thyristor SCR, and an anode thereof is connected to a connection point of resistors R19 and R20 of inverter driving section 10. Fourteenth output terminal Q14 of counter IC U2 is connected to the gate of thyristor SCR via resistor R41 and then diode D18. Additionally, it is connected to the base of transistor TR9 via resistor R41 and then diode D21. Tenth output terminal Q10 of counter IC U2 is connected to the base of transistor TR9 via resistor R40 and then diode D20. Diode D22 is connected between the base of transistor TR8 and a cathode of diode D20. A non-inverting input terminal (+) of OP amplifier OP2 is connected to a connection point of resistors R25 and R26 of constant output control section 30, and an inverting terminal (−) thereof is connected to a connection point of resistors R23 and R24. Diode D19 is connected between the output terminal of OP amplifier OP2 and the gate of thyristor SCR.

Counter U2 divides an input power source voltage supplied via connection point 13 by means of resistors R38 and R39 to be received via its clock terminal CLK. When AC power source 102 in ordinary use is 60 Hz, for example, output terminal Q10 of counter U2 repeats the LOW and HIGH during a predetermined time interval, e.g., approximately 5 seconds. By means of this signal, transistor TR9 repeats the switching of OFF and ON. When transistor TR9 is OFF, the inverting terminal voltage of PWM IC U1 in inverter driving section 10 is higher than the non-inverting terminal voltage thereof to provide the driving signal. If it is ON, all driving signals are OFF. This is for protecting the ballast by repeating the ON and OFF operations of the driving signal for about 5 seconds interval when the gas discharge lamp is not lighted during the starting operation. On the other hand, output terminal Q14 of counter U2 provides the LOW and HIGH signals during a predetermined time interval, e.g., for about 1 minute. If the gas discharge lamp is not lighted regardless of elapsing of the time, thyristor SCR is driven to halt all signals of the ballast. When the gas discharge lamp is normally lighted, starting control section 40 is operated to turn on transistor TR10. Accordingly, even though the high signal is generated from terminals Q10 and Q14 of counter IC U2, the levels of all signals generated are dropped down to the minus level to maintain the normal light-on operation. If the ballast is overheated due to a certain reason, temperature switch T/S is operated and the gate signal is applied to thyristor SCR, thereby blocking the drive. In case of the over-current, the inverting terminal voltage of OP amplifier OP2 becomes higher than the non-inverting terminal voltage to generate the output signal and the gate signal is supplied to thyristor SCR, thereby blocking the driving signal. Therefore, thyristor SCR once operated maintains the operating state by resistor R45 while terminal RST of counter U2 becomes low to stop the counter signal. By this operation, the ballast is protected by blocking the driving signal in case of lighting failure, overheat, over-current, etc.

In the present invention, the waveform for driving the inverter is shifted on the basis of the analog system by the inverter control circuit for preventing the unstable lighting of the gas discharge lamp caused by flame fluctuation. Moreover, the stability of the ballast is improved in operation, while the circuit is simplified to decrease the manufacturing cost of the gas discharge lamp.

In addition, the dead time of the signal existing section of the inverter driving section is optionally adjustable to make the ballast having a relatively high output practical. Also, by controlling the frequency, the output of the gas discharge lamp, which is generally inconsistent according to different manufacturers and its tendency to increase which shortens the life of the gas discharge lamp, can be maintained constant in addition to providing efficient starting operation.

Furthermore, the ballast is protected during an abnormal state such as overheat, starting failure and over-current.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An electronic ballast for a gas discharge lamp comprising:
    a power source section for receiving and transforming an AC power source to a DC voltage;
    an inverter section for switching and transforming an output voltage of said power source section at high speed to transform it as an AC power source in response to a paid of switching driving signals, and providing said AC power source to a gas discharge lamp;
    an inverter control section for generating said pair of switching driving signals respectively having a predetermined dead time within a switching-ON time interval while having a phase difference of 180 degrees form each other;
    an auxiliary power source section for supplying an auxiliary power source required in said inverter controlling section by means of said output voltage of said power source section; and
    a starting section for generating a high voltage when performing a starting operation;
    wherein said inverter section comprises a full-bridge type inverter circuit which includes a plurality of switching devices, a plurality of diodes and a first transformer combined with a current-stabilizing inductor; and a transformer for suppressing switching noises and for preventing said switching devices from being damaged by a transient current upon starting.

2. An electronic ballast for a gas discharge lamp as claimed in claim 1, wherein said inverter controlling section controls said reference frequency of said driving signals to be gradually shifted in accordance with the time for one period based on an analog system in a periodically repeating manner.

3. An electronic ballast for a gas discharge lamp as claimed in claim 1, wherein said inverter controlling section comprises a constant output control unit for stabilizing an output of said gas discharge lamp in a rated output level by the feedback of said power source applied to said gas discharge lamp.

4. An electronic ballast for a gas discharge lamp as claimed in claim 1, wherein said inverter controlling section comprises a starting control unit for controlling said frequency of said switching driving signals to be lower than a constant output frequency during the starting of said gas discharge lamp to heighten the output of said gas discharge lamp, thereby allowing said gas discharge lamp to be easily started.

5. An electronic ballast for a gas discharge lamp as claimed in claim 1, wherein said inverter controlling section comprises a protection circuit unit for protecting said ballast by blocking said switching driving signals during overheat of said ballast, starting failure and over-current.

6. An electronic ballast for a gas discharge lamp comprising:
    a power source section for receiving and transforming an AC power source to a DC voltage;
    an inverter section for switching and transforming an output voltage of said power source section at high speed to transform it as an AC power source in response to a paid of switching driving signals, and providing said AC power source to a gas discharge lamp;

an inverter control section for generating said pair of switching driving signals respectively having a predetermined dead time within a switching-ON time interval while having a phase difference of 180 degrees form each other;

an auxiliary power source section for supplying an auxiliary power source required in said inverter controlling section by means of said output voltage of said power source section; and a starting section for generating a high voltage when performing a starting operation; and an electronic ballast for a gas discharge lamp, wherein said inverter section comprises a full-bridge type inverter circuit which includes a plurality of switching devices, a plurality of diodes and a first transformer combined with a current-stabilizing inductor; and a transformer for suppressing switching noises and for preventing said switching devices from being damaged by a transient current upon starting;

wherein said inverter control section comprises an inverter driving unit controlled by a predetermined frequency shift signal for supplying said switching driving signals to said inverter section by being sequentially shifted from a reference frequency to another predetermined frequency for one period; and a frequency shift unit for supplying said predetermined frequency shift signal to said inverter driving unit; and wherein said inverter driving unit comprises a PWM IC, and an output dividing circuit for dividing and providing two output signals of said PWM IC as said switching driving signals; and said frequency shift unit comprises an analog circuit for gradually changing a resistance value applied to an RT terminal for determining the output signal frequency of said PWM IC in accordance with a time for one period and then periodically repeat the change of said resistance value.

* * * * *